May 20, 1924.
J. G. ZWICKER
PIPE JOINT
Filed Feb. 24, 1922
1,494,523
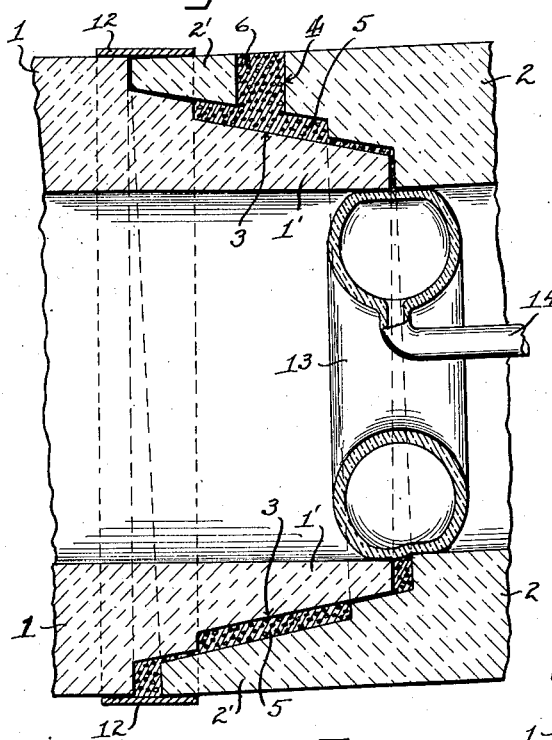
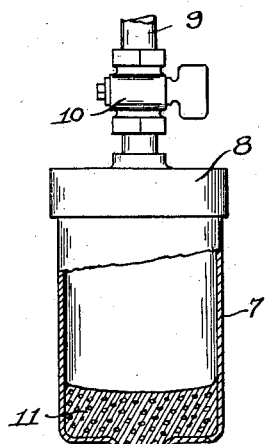
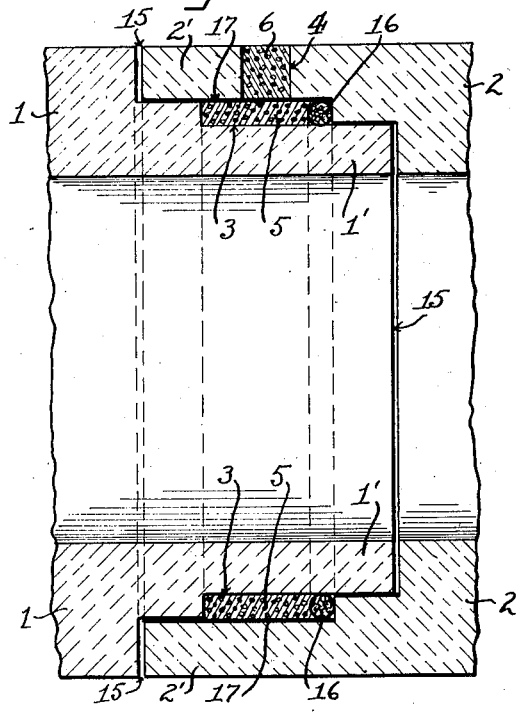
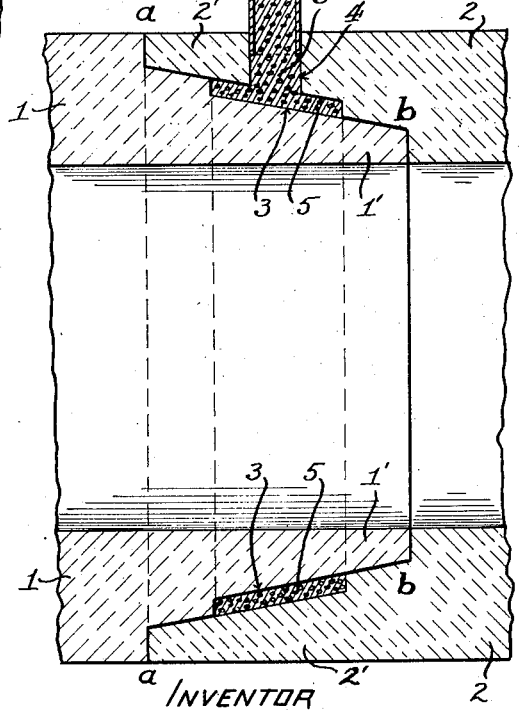
INVENTOR
Julius G. Zwicker
BY Booth & Booth
ATTORNEYS Patented May 20, 1924.

1,494,523

UNITED STATES PATENT OFFICE.

JULIUS G. ZWICKER, OF BERKELEY, CALIFORNIA, ASSIGNOR, BY MESNE ASSIGNMENTS, TO EDWIN L. POWELL, OF NEW ORLEANS, LOUISIANA.

PIPE JOINT.

Application filed February 24, 1922. Serial No. 539,053.

*To all whom it may concern:*

Be it known that I, JULIUS G. ZWICKER, a citizen of the United States, residing at Berkeley, in the county of Alameda and State of California, have invented certain new and useful Improvements in Pipe Joints, of which the following is a specification.

My invention relates to the general art of producing conduits composed of pipe sections, and it concerns particularly the joints between said sections.

Although my invention is applicable to pipe sections of any material, it is especially adapted for and finds its highest utility in connection with concrete pipe sections and conduits produced therefrom, and in this connection I shall herein describe it.

The object of my invention is to make fluid tight joints between the pipe sections, whether said joints be expansible or non-expansible, and to this end my invention consists in the novel joint which I shall now fully describe by reference to the accompanying drawings, in which—

Fig. 1 is a longitudinal section through the joint of two pipe sections, also illustrating the means for sealing said joint; the joint here shown being of the non-expansible type.

Fig. 2 is a longitudinal section through the non-expansible joint of two pipe sections when the sections are fitted in angular instead of linear direction, and also showing the means for temporarily closing the joint spaces exteriorly and interiorly, while the joint is being made.

Fig. 3 is a longitudinal section through the joint of two pipe sections, the joint being of the expansion type.

Referring first to Fig. 1, the two pipe sections are indicated by the numerals 1 and 2, the section 1 being with respect to its end here shown, the male section, and 2 being the female section, the other ends of said sections being, as is common, the reverse. The interfitting slip tongues 1' and 2', respectively, of these sections abut at their respective bases along the lines *a—a* and *b—b* respectively, but their adjacent tapering surfaces are shouldered or rabbeted oppositely to form between them the relatively shallow and confined annular chamber 3. Through the tongue 2' of the female section is made an opening 4 leading into the confined chamber 3.

The chamber 3 is filled with a sealing body 5, as is also the opening 4, with a similar body 6. The sealing body may be of any suitable material, but in its best and preferred form, especially in connection with concrete-pipe, such, as it may be assumed, the sections 1 and 2 are, it is an hydraulic cement, which is introduced as an aqueous paste, and which subsequently hardens within the confined chamber and produces a fluid-tight joint.

The introduction of this cement paste is a matter of moment and constitutes the basis of my means for sealing the improved joint.

The cement paste is introduced through the opening 4 under pressure, so that it fills the chamber 3, the air escaping past the meeting tongue surfaces. In working with a cement paste I have found that the most practicable way, if indeed it be not the only way, of applying pressure, is by means of compressed air. Accordingly, I have shown a container 7 the outlet neck 7' of which is fitted to the opening 4. With a removable cap 8 of this container is connected a pipe 9 controlled by a cock 10, said pipe leading from a suitable source of compressed air, not shown. The cement paste, shown at 11, is supplied to the container 7 and when the air is admitted, the paste is forced into and fills the chamber 3 and the opening 4. Thus a rigid slip joint is formed which is fluid tight, and is not subject to external causes of injury, such as that to which the ordinary encircling cement seal is exposed. In connection with cement pipe, the sealing cement paste practically forms a monolithic joint.

In Fig. 2 I illustrate the case of the two pipe sections fitted at an angle. Because of this angular arrangement the base abutments of the interfitting tongues are more or less broken leaving spaces both on the interior of the pipe and on the exterior, as shown. In this case, I temporarily close the exteriorly directed space, with an encircling metallic ring 12, and to conveniently temporarily close the space opening interiorly, I fit within the pipe an inflatable tube 13 which covers said space. This tube has a connection 14 with the source of compressed air, and when inflated it fits tightly within the pipe and covers the interior joint space. Then I force in the liquid cement, as heretofore described to fill the entire joint space.

In order to make an expansion slip joint, my invention is further developed as shown in Fig. 3.

In this case the adjacent surfaces of the interfitting tongues are parallel with the axis of the pipe to provide for the slip under expansion and contraction. The tongues are fitted with a sufficient space between their ends and bases as shown at 15 to permit the slipping movement. In the confined annular chamber 3 is placed at one end a compressible ring 16 of fibre or any suitable material. Also the inner surface of the tongue 2' of the female pipe section 2 is coated with a lubricant, say of paraffine, indicated by 17.

The chamber 3 is then filled with the cement paste body 5 in the manner heretofore described, the filling opening 4, however being left temporarily vacant. The cement paste body 5 in hardening tends to slightly contract away from the paraffined surface 17 of the female tongue so that the pipe sections may expand and contract, the sealing body slipping with the male tongue, against the compressible ring 16. The opening 4 is subsequently filled with a separate cement body 6, an intervening paraffine layer preventing it from uniting with the body 5.

I claim:—

1. A pipe-joint comprising interfitting male and female tongues on the adjacent ends of pipe sections, said tongues on their circumferential faces being formed to leave an annular, confined chamber between them; a compressible ring seated in said chamber; and a sealing body of hydraulic cement filling the remainder of said chamber.

2. A pipe-joint comprising interfitting male and female tongues on the adjacent ends of pipe-sections, said tongues on their circumferential faces being formed to leave an annular, confined chamber between them, and the circumferential face of the female tongue having a lubricant coating; a compressible ring seated in said chamber; and a sealing body of hydraulic cement filling the remainder of said chamber.

In testimony whereof I have signed my name to this specification.

JULIUS G. ZWICKER.